(12) United States Patent
Hommelberg et al.

(10) Patent No.: US 9,964,933 B2
(45) Date of Patent: May 8, 2018

(54) SYSTEM FOR DISTRIBUTING ELECTRICAL ENERGY OVER A CLUSTER OF ELECTRICAL DEVICES, METHOD FOR DISTRIBUTING ELECTRICAL ENERGY OVER A CLUSTER OF ELECTRICAL DEVICES OF SUCH A SYSTEM AND CONTROLLER FOR USE IN SUCH A SYSTEM

(71) Applicant: VLAAMSE INSTELLING VOOR TECHNOLOGISCH ONDERZOEK (VITO), Mol (BE)

(72) Inventors: Maarten Hommelberg, Amsterdam ZE (NL); Bert Claessens, Spalbeek (BE)

(73) Assignee: VLAAMSE INSTELLING VOOR TECHNOLOGISCH ONDERZOEK (VITO), Mol (BE)

( * ) Notice: Subject to any disclaimer, the term of this patent is extended or adjusted under 35 U.S.C. 154(b) by 655 days.

(21) Appl. No.: 14/309,419

(22) Filed: Jun. 19, 2014

(65) Prior Publication Data
US 2014/0303795 A1    Oct. 9, 2014

Related U.S. Application Data

(63) Continuation-in-part of application No. PCT/EP2012/076882, filed on Dec. 24, 2012.

(30) Foreign Application Priority Data

Dec. 23, 2011 (EP) .................................. 11195718

(51) Int. Cl.
*G05B 15/02* (2006.01)
*G06Q 10/00* (2012.01)

(52) U.S. Cl.
CPC ............. *G05B 15/02* (2013.01); *G06Q 10/00* (2013.01)

(58) Field of Classification Search
CPC ............ G05B 15/02; G06Q 10/00; H02J 3/00
(Continued)

(56) References Cited

U.S. PATENT DOCUMENTS

2004/0111226 A1    6/2004    Brewster
2008/0040223 A1    2/2008    Bridges
(Continued)

FOREIGN PATENT DOCUMENTS

FR    2876475 A1    4/2006
JP    2000-032658 A    1/2000
(Continued)

OTHER PUBLICATIONS

EP Office Action dated Oct. 31, 2013, for EP 11 195 718.9.
(Continued)

*Primary Examiner* — Christopher E Everett
(74) *Attorney, Agent, or Firm* — Bacon & Thomas, PLLC (57) ABSTRACT

The system comprises a controller comprising software components for determining the difference between the amount of energy determined by the smart grid agent to be delivered to and from the cluster over a predetermined period of time and the amount of energy measured by the meter actually delivered to the cluster over the predetermined period of time, the controller comprising software components for simulating a virtual smart grid participating device based on the determined difference and for providing the smart grid agent with information based on the determined difference such that the smart grid agent is configured to determine the amount of electrical energy in function of time to be delivered to and from the electrical grid for both the smart grid participating and non-participating devices of
(Continued)

the cluster based on information of both the devices of the cluster and the smart grid and such that the difference is reduced.

22 Claims, 3 Drawing Sheets

(58) Field of Classification Search
USPC .................................. 700/286, 291, 295–297
See application file for complete search history.

(56) References Cited

U.S. PATENT DOCUMENTS

| | | | | |
|---|---|---|---|---|
| 2008/0103714 | A1* | 5/2008 | Aldrich | G01J 3/46 |
| | | | | 702/81 |
| 2009/0228324 | A1 | 9/2009 | Ambrosio | |
| 2010/0191487 | A1* | 7/2010 | Rada | G05F 1/70 |
| | | | | 702/60 |
| 2011/0148202 | A1* | 6/2011 | Rada | G05F 1/70 |
| | | | | 307/52 |
| 2011/0270453 | A1* | 11/2011 | Kalogridis | H02J 3/14 |
| | | | | 700/291 |
| 2011/0298284 | A1* | 12/2011 | Thomson | H02J 3/14 |
| | | | | 307/40 |

FOREIGN PATENT DOCUMENTS

| | | |
|---|---|---|
| JP | 2005-045866 A | 2/2005 |
| JP | 2009-516490 A | 4/2009 |
| WO | 2007/053958 A1 | 5/2007 |

OTHER PUBLICATIONS

EP Office Action dated Jul. 9, 2014, for EP 11 195 718.9.
EP Office Action dated Mar. 11, 2015, for EP 11 195 718.9.
International Search Report (ISR) dated Mar. 4, 2013, for PCT/EP2012/076882.
Written Opinion dated Mar. 4, 2013, for PCT/EP2012/076882.
Japanese Office Action dated Nov. 29, 2016, for JP 2014-548109, and English translation thereof.
Japanese Office Action dated May 9, 2017, for JP 2014-548109, and English translation thereof.

* cited by examiner

SYSTEM FOR DISTRIBUTING ELECTRICAL ENERGY OVER A CLUSTER OF ELECTRICAL DEVICES, METHOD FOR DISTRIBUTING ELECTRICAL ENERGY OVER A CLUSTER OF ELECTRICAL DEVICES OF SUCH A SYSTEM AND CONTROLLER FOR USE IN SUCH A SYSTEM

BACKGROUND OF THE INVENTION

The current invention relates to a system for distributing electrical energy over a cluster of electrical devices according to the preamble of the first claim.

The present invention also relates to a method for distributing electrical energy over a cluster of electrical devices of such a system and a controller for use in the system according to the invention.

Such systems are already known to the person skilled in the art. US2009/0228324 for example describes a smart grid for distributing electrical energy over a cluster of electrical devices, for example a cluster comprising all the electrical devices of a single household. The cluster comprises at least one smart grid participating electrical device, for example a dishwasher, a tumble drier, a washing machine, etc. all sporting some sort of flexibility with respect to the execution of the task assigned to them, such as for example when the task should be finished, and at least one smart grid non-participating electrical device, for example a television, a light bulb, etc. none sporting flexibility with respect to when their task should be finished as immediate performance of the task assigned is expected, for example showing moving images or lighting a room. The smart grid participating device is connected to an electrical grid through a smart grid by a smart grid agent. The smart grid agent is configured to determine the amount of electrical energy in function of time to be delivered to and from the electrical grid for the smart grid device of the cluster based on information, in the form of marginal demand functions, of the smart grid device and the smart grid. The system further comprises a meter for measuring the amount of electrical energy actually delivered to and from the electrical grid for the cluster, usually in the form of an electricity meter, in this specific case for example measuring the electricity delivered to and from the electric grid to the devices of the household.

However, according to such systems, the smart grid non-participating electrical device, when switched on, can for example immediately draw electrical energy from the electrical grid. However, the electrical energy in such a situation is not obtained through the smart grid using the smart grid agent but directly from the electrical grid such that more electrical energy is being drawn from the electrical grid than determined by the smart grid agent. Such situations can be very undesired as will be illustrated below.

For example, in a cluster comprising an electrical charging device, for example a battery, and an electrical producing device, for example photovoltaic elements, the smart grid agent can have determined that the electrical energy produced by the producing device is stored in the storing device. However, when suddenly a smart grid non-participating device, for example creating an unflexible load such as for example a light bulb, a television set, etc., is switched on, the electrical energy for that device is drawn directly from the electrical grid and not from the producing device, as it is often desired that the cluster consumes as much as possible its locally generated electrical energy. According to another example, suddenly an additional producing device is switched on such that the additionally produced electrical energy is not directed to charging the charging device but is instead delivered to the electrical grid, as it is often desired that the cluster consumes as much as possible its locally generated electrical energy.

Moreover, when the smart grid non-participating devices are not taken into account by the smart grid agent when determining how much energy should be drawn from the electrical grid, the determined amount of energy to be drawn from the grid by the smart grid participating devices could be completely wrong, for example even endangering the availability of electrical energy, as for example a lot of smart grid participating devices and/or smart grid non-participating devices requiring large amounts of electrical energy in, for example, short periods of time, would draw electrical energy from the grid without the smart grid agent knowing and therefore without the smart grid agent taking this use electrical energy into account.

Although it is possible to convert smart grid non-participating electrical devices to smart grid participating electrical devices, this requires the difference smart grid non-participating electrical devices to be all connected to the smart grid, usually requiring the hardware of the smart grid non-participating electrical devices to be changed, interconnecting the converted smart grid non-participating electrical devices to the smart grid, for example requiring new wiring or wireless connections. Such hardware conversion and interconnections with the smart grid are however very cumbersome to do and usually require a lot of work and even sometimes adaptations to the building in which the devices are located, especially when taking into account that a lot of the smart grid non-participating electrical devices are relatively small and inexpensive such as for example light bulbs, radios, etc.

SUMMARY OF THE INVENTION

Therefore, it is an object of the current invention to provide a system for distributing electrical energy over a cluster of electrical devices, which can take into account the occurrence of the use of electrical energy of one or more smart grid non-participating electrical devices without requiring to convert all the smart grid non-participating electrical devices to smart grid participating electrical devices.

This is achieved according to a system for distributing electrical energy over a cluster of electrical devices, the cluster comprising at least one smart grid participating electrical device and at least one smart grid non-participating electrical device, the smart grid participating device having flexibility with respect to the execution of a task assigned to it and being connected to an electrical grid through a smart grid by a smart grid agent, the smart grid agent being configured to determine the amount of electrical energy in function of time to be delivered to and from the electrical grid for the smart grid device of the cluster based on information of the smart grid device and the smart grid, the system further comprising a meter for measuring the amount of electrical energy actually delivered to and from the electrical grid for the cluster, the system comprising a controller comprising software components for determining the difference between the amount of energy determined by the smart grid agent to be delivered to and from the cluster over a predetermined period of time and the amount of energy measured by the meter actually delivered to and from the cluster over the predetermined period of time, the controller comprising software components for simulating a virtual smart grid participating device based on the determined difference and for providing the smart grid agent with information based on the determined difference such that the smart grid agent is configured to determine the amount of electrical energy in function of time to be delivered to and from the electrical grid for both the smart grid participating device and non-participating device modelled as the virtual smart grid participating device of the cluster based on information of both the smart grid participating and non-participating devices of the cluster and the smart grid and the system being adapted to control the energy distribution such that the difference between the amount of energy determined by the smart grid agent to be delivered to and from the cluster over the predetermined period of time and the amount of energy measured by the meter actually delivered to the cluster over the predetermined period of time is reduced.

Thereto, the system comprises a controller comprising software components for determining the difference between the amount of energy determined by the smart grid agent to be delivered to and from the cluster over a predetermined period of time and the amount of energy measured by a meter actually delivered to the cluster over the predetermined period of time, the controller comprising software components for simulating a virtual smart grid participating device based on the determined difference and for providing the smart grid agent with information based on the determined difference such that the smart grid agent is configured to determine the amount of electrical energy in function of time to be delivered to and from the electrical grid for both the smart grid participating and non-participating devices of the cluster based on information of both the smart grid participating and non-participating devices of the cluster and the smart grid and such that the difference between the amount of energy determined by the smart grid agent to be delivered to and from the cluster over the predetermined period of time and the amount of energy measured by the meter actually delivered to the cluster over the predetermined period of time is reduced.

It has been found that such a controller allows the smart grid agent to take into account the occurrence of a smart grid non-participating device such that a more optimal distribution of the electrical energy to the devices of the cluster can be obtained.

Moreover, it has been found that since a virtual smart grid agent is created by the controller, no substantial hardware reconfiguration of the network is necessary and that existing configuration of smart grids can be substantially retained.

Moreover, as the detection of the usage of electrical energy by non-participating devices is done by determining the difference between the amount of energy determined by the smart grid agent to be delivered to and from the cluster over the predetermined period of time and the amount of energy measured by the meter actually delivered to the cluster over the predetermined period of time, no specific measurements have to be done for specific non-participating devices, therefore not requiring respective measurements of usage of electrical energy.

Any type of smart grid with any type of smart grid agents can be used according to the invention: for example decentralized smart grids using decentralized smart grid agents or centralized smart grids using more decentralized smart grid agents. According to a specific example the smart grid is INTELLIGATOR® developed by VITO NV, including also systems derived therefrom and any updates. However other examples are for example POWERMATCHER® developed by ECN/TNO.

The actual simulation of the smart grid agent depends on the specific smart grid used and can be determined by the person skilled in the art. The output of the PID controller can be fashioned directly into a horizontal bidding function.

The cluster can be any type of cluster of electrical devices, such as for example a cluster of devices belonging to a single household, a cluster of devices belonging to several households such as for example a city, a neighborhood of a city, a street, etc.

Often the meter for measuring the amount of electrical energy actually delivered to and from the electrical grid for the cluster are already provided and available, for example in the form of smart meters.

The controller can for example be provided as a computer or a server connected to the smart grid and receiving signals representing the amount of energy determined by the smart grid agent to be delivered to and from the cluster over a predetermined period of time and signals representing the amount of energy measured by the meter actually delivered to the cluster over the predetermined period of time for determining the difference between them.

According to preferred embodiments of the current invention, the system comprises a plurality of smart grid participating and smart grid non-participating electrical devices.

The invention also relates to a method for distributing electrical energy over a cluster of electrical devices of a system according to the invention. The cluster comprises at least one smart grid participating electrical device and at least one smart grid non-participating electrical device. The smart grid participating device is connected to an electrical grid through a smart grid by a smart grid agent. The smart grid agent determines the amount of electrical energy in function of time to be delivered to and from the electrical grid for the smart grid device of the cluster based on information of the smart grid device and the smart grid. The system further comprises a meter measuring the amount of electrical energy actually delivered to and from the electrical grid for the cluster. The system also comprises a controller determining the difference between the amount of energy determined by the smart grid agent to be delivered to and from the cluster over a predetermined period of time and the amount of energy measured by the meter actually delivered to the cluster over the predetermined period of time. The controller simulates a virtual smart grid participating device based on the determined difference and provides the smart grid agent with information based on the determined difference such that the smart grid agent determines the amount of electrical energy in function of time to be delivered to and from the electrical grid for both the smart grid participating and non-participating devices of the cluster based on information of both the smart grid participating and non-participating devices of the cluster and the smart grid and such that the difference between the amount of energy determined by the smart grid agent to be delivered to and from the cluster over the predetermined period of time and the amount of energy measured by the meter actually delivered to the cluster over the predetermined period of time is reduced.

According to preferred embodiments of the current invention, the simulation by the controller of the virtual smart grid participating device based on the determined different is done by, based on determined differences in the past, determining an expected amount of energy which will be used by the smart grid non-participating electrical device over the next predetermined period of time.

According to preferred embodiments of the current invention, the determination of the expected amount of energy is done periodically, preferably every predetermined period of time.

According to preferred embodiments of the current invention, the determined differences in the past used for determining the expected amount of energy which will be used by the smart grid non-participating electrical device over the next period of time comprise the differences determined at a statistically comparable time in the past.

According to preferred embodiments of the current invention, the statistical comparable time is any one of the previous day, the previous week, the previous month, the previous year.

According to further preferred embodiments of the current invention, the determined differences in the past comprise the determined differences from the previous predetermined period of time.

According to preferred embodiments of the method according to the present invention, the controller simulates the virtual smart grid agent using a PID controller. Such a PID controller has been found to allow a relative simple simulation of the virtual smart grid agent. According to more preferred embodiments of the method according to the present invention, the PID controller is a PI controller.

Such controllers are already known to the person skilled in the art as proportional-integral-derivative controllers. The PID controller calculation (being an algorithm) involves three separate, preferably constant, parameters: a proportional, an integral and a derivative parameter, usually denoted P, I, and D. These parameters can be interpreted in terms of time: P depends on the present error, I depends on the accumulation of past errors, and D is a prediction of future errors, based on current rate of change. According to preferred embodiments the controller is a PI controller, being therefore a PID controller wherein D equals zero. The PID controller calculation is illustrated below:

$$u(t) = P \cdot e(t) + I \cdot \int_0^t e(\tau)d\tau + D \cdot \frac{d}{dt}e(t)$$

Wherein u(t) is the output of the PID controller, the parameters P, I and D are as explained above and represent respectively proportional gain, integral gain and derivative gain, t represents the elapsed time since the beginning represented by 0 and e(t) represents the error, in this case being the difference between the amount of energy determined by the smart grid agent to be delivered to and from the cluster over the predetermined period of time and the amount of energy measured by the meter actually delivered to the cluster over the predetermined period of time.

It has been found that when the D equals zero, the controller is less susceptible to sudden changes in the determined difference. As the determined difference depends on the electrical energy used by the smart grid non-participating electrical devices it often represents sudden changes due to the nature of the smart grid non-participating electrical devices. Therefore, it has been found that when equaling D to zero the controller will be far more stable offering improved smart grid interaction of the smart grid non-participating electrical devices.

According to preferred embodiments, determining the expected amount of energy which will be used by the smart grid non-participating electrical device over the next period of time, based on determined differences in the past, is done using the PID controller.

According to preferred embodiments, the controller determines the difference between the amount of energy determined by the smart grid agent to be delivered to and from the smart grid participating electrical device over the predetermined period of time and the amount of energy measured by the meter actually delivered to the cluster over the predetermined period of time.

The invention also relates to a controller for use in the system according to the invention, for determining the difference between the amount of energy determined by the smart grid agent to be delivered to and from the cluster over a predetermined period of time and the amount of energy measured by the meter actually delivered to the cluster over the predetermined period of time. The controller is provided to simulate a virtual smart grid participating device based on the determined difference and to provide the smart grid agent with information based on the determined difference such that the smart grid agent is configured to determine the amount of electrical energy in function of time to be delivered to and from the electrical grid for both the smart grid participating and non-participating devices of the cluster based on information of both the smart grid participating and non-participating devices of the cluster and the smart grid and such that the difference between the amount of energy determined by the smart grid agent to be delivered to and from the cluster over the predetermined period of time and the amount of energy measured by the meter actually delivered to the cluster over the predetermined period of time is reduced.

The invention will be further elucidated by means of the following description and the appended figures.

DETAILED DESCRIPTION OF THE INVENTION

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Figure 2:
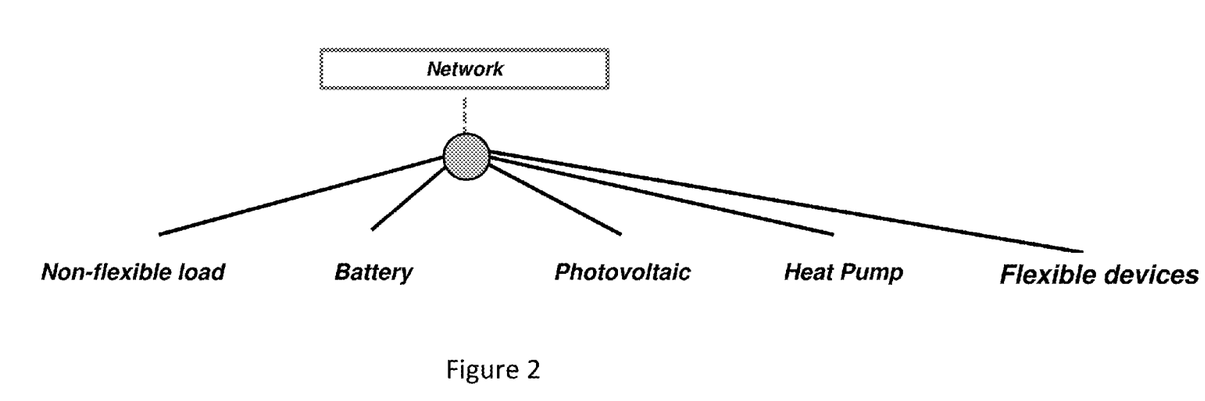
FIG. 2 shows schematically a network according to an embodiment of the present invention.

FIG. 2 is a schematic representation of a smart grid for distributing electrical energy over a cluster of consuming and/or producing electrical devices. The smart grid can be implemented as a market based multi-agent system. Such a cluster can be all the electrical devices of a single household or much larger clusters. For example a cluster may comprise a producing device such as a heat pump, hydroelectric scheme, pump storage scheme which can provide energy quickly and at any time. Other devices may be like photovoltaic cells that only produce electricity when the sun shines. Other devices such as batteries may consume energy, e.g. when charging and distribute energy, e.g. when discharging. The cluster comprises at least one smart grid participating electrical device or flexible device, for example a dishwasher, a tumble drier, a washing machine, etc. all sporting some sort of flexibility with respect to the execution of the task assigned to them, such as for example when the task should be finished, Some consuming device may be legacy, smart grid non-participating devices, for example a television, a light bulb, etc. none sporting flexibility with respect to when their task should be finished as immediate performance of the task assigned is expected, for example showing moving images or lighting a room.

The smart grid participating devices are connected to an electrical grid through a smart grid by a smart grid agent. The smart grid agent is configured to determine the amount of electrical energy in function of time to be delivered to and from the electrical grid for the smart grid device of the cluster based on information, in the form of marginal demand functions, of the smart grid device and the smart grid.

Figure 3:
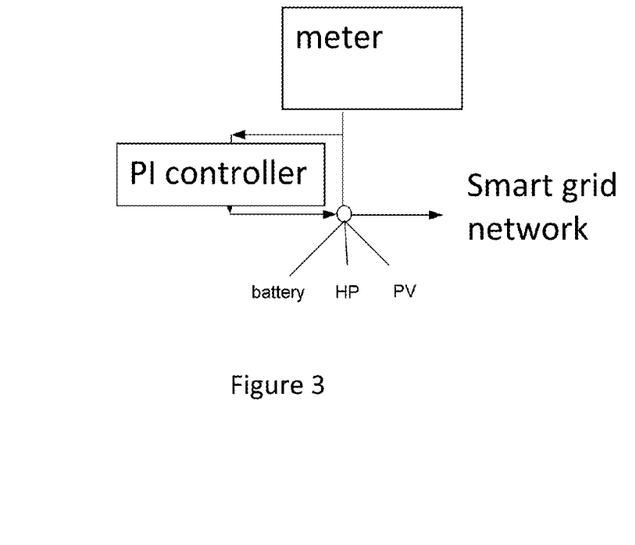
FIG. 3 shows schematically a controller implemented as a PI or PID controller in accordance with an embodiment of the present invention.
Figure 4:
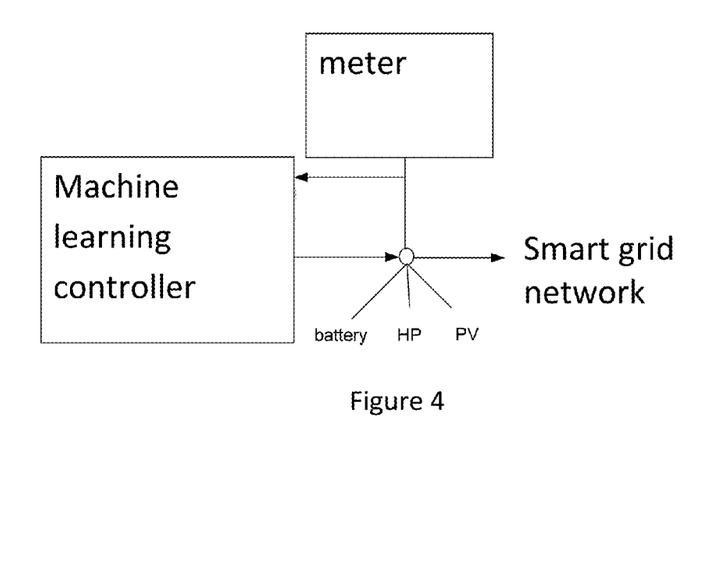
FIG. 4 shows schematically a controller implemented as a machine learning implementation in accordance with an embodiment of the present invention.

As shown schematically in FIGS. 3 and 4, the system further comprises a meter for measuring the amount of electrical energy actually delivered to and from the electrical grid for the cluster, usually in the form of an electricity meter, in this specific case for example measuring the electricity delivered to and from the electric grid to the various devices.

The system also comprises a controller comprising software components for determining the difference between the amount of energy determined by the smart grid agent to be delivered to and from the cluster over a predetermined period of time and the amount of energy measured by a meter actually delivered to the cluster over the predetermined period of time. The controller comprises software components for simulating a virtual smart grid participating device based on the determined difference and for providing the smart grid agent with information based on the determined difference such that the smart grid agent is configured to determine the amount of electrical energy in function of time to be delivered to and from the electrical grid for both the smart grid participating and non-participating devices of the cluster based on information of both the smart grid participating and non-participating devices of the cluster and the smart grid and such that the difference between the amount of energy determined by the smart grid agent to be delivered to and from the cluster over the predetermined period of time and the amount of energy measured by the meter actually delivered to the cluster over the predetermined period of time is reduced. An example of a controller which can simulate the legacy devices, i.e. the smart grid non-participating devices, is a PID or PI controller as shown in FIG. 3.

Such controllers are already known to the person skilled in the art as proportional-integral-derivative controllers. The PID controller calculation (being an algorithm) involves three separate, preferably constant, parameters: a proportional, an integral and a derivative parameter, usually denoted P, I, and D. These parameters can be interpreted in terms of time: P depends on the present error, I depends on the accumulation of past errors, and D is a prediction of future errors, based on current rate of change. According to preferred embodiments the controller is a PI controller, being therefore a PID controller wherein D equals zero. The PID controller calculation is illustrated below:

$$u(t) = P \cdot e(t) + I \cdot \int_0^t e(\tau)d\tau + D \cdot \frac{d}{dt}e(t)$$

Wherein u(t) is the output of the PID controller, the parameters P, I and D are as explained above and represent respectively proportional gain, integral gain and derivative gain, t represents the elapsed time since the beginning represented by 0 and e(t) represents the error, in this case being the difference between the amount of energy determined by the smart grid agent to be delivered to and from the cluster over the predetermined period of time and the amount of energy measured by the meter actually delivered to the cluster over the predetermined period of time.

It has been found that when the D equals zero, the controller is less susceptible to sudden changes in the determined difference. As the determined difference depends on the electrical energy used by the smart grid non-participating electrical devices it often represents sudden changes due to the nature of the smart grid non-participating electrical devices. Therefore, it has been found that when equaling D to zero the controller will be far more stable offering improved smart grid interaction of the smart grid non-participating electrical devices.

According to preferred embodiments, determining the expected amount of energy which will be used by the smart grid non-participating electrical device over the next period of time, based on determined differences in the past, is done using the PID controller.

According to preferred embodiments, the controller determines the difference between the amount of energy determined by the smart grid agent to be delivered to and from the smart grid participating electrical device over the predetermined period of time and the amount of energy measured by the meter actually delivered to the cluster over the predetermined period of time.

The present invention is not limited to a PID or PI controller although such a controller is simple and efficient. For example, machine learning can be used instead of the PI or PID controller.

The PI controller will most likely have a reasonable performance, other implementations are included within the scope of the embodiments of the present invention. An alternative implementation can be provided by using a machine learning based controller. Typical algorithms to be implemented in such a controller can be any of random forests, neural networks support vector machines. When random forests or another ensemble method is used, the implementation can be as shown schematically in FIG. 4.

The meter provides data which is collected over a time period, e.g. the difference in load caused by operation of the non-participating legacy devices. This data can be recorded by day, time of day, week, month, season. Additional data may also be recorded such as air temperature or humidity which can affect heating or cooling loads. The machine learning implementation would make use of this historical data to prepare a best estimate of the load in the next time period using any suitable algorithm such as the ones mentioned above. At least theoretically, the machine learning implementation would be able to use the data more efficiently, e.g. detect the type of device present, and by using this information be able to predict better what the consumption would be for the next time slot, making the virtual agent more performant. However the increase in complexity such as processing additional data, e.g. temperature, day of the week . . . , will make this implementation less straightforward.

Figure 1A:
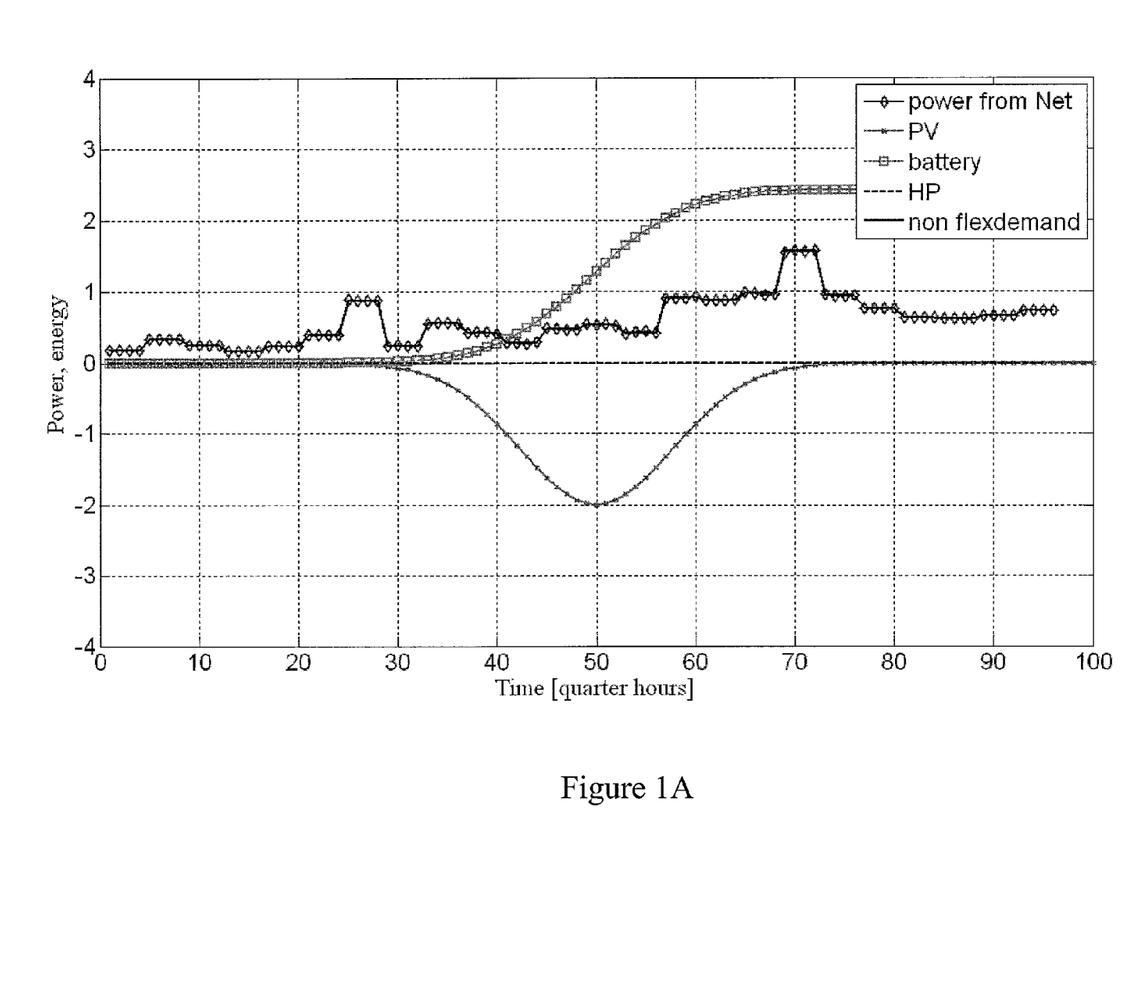
FIG. 1A shows a result of simulations over a smart grid without the current invention.
Figure 1B:
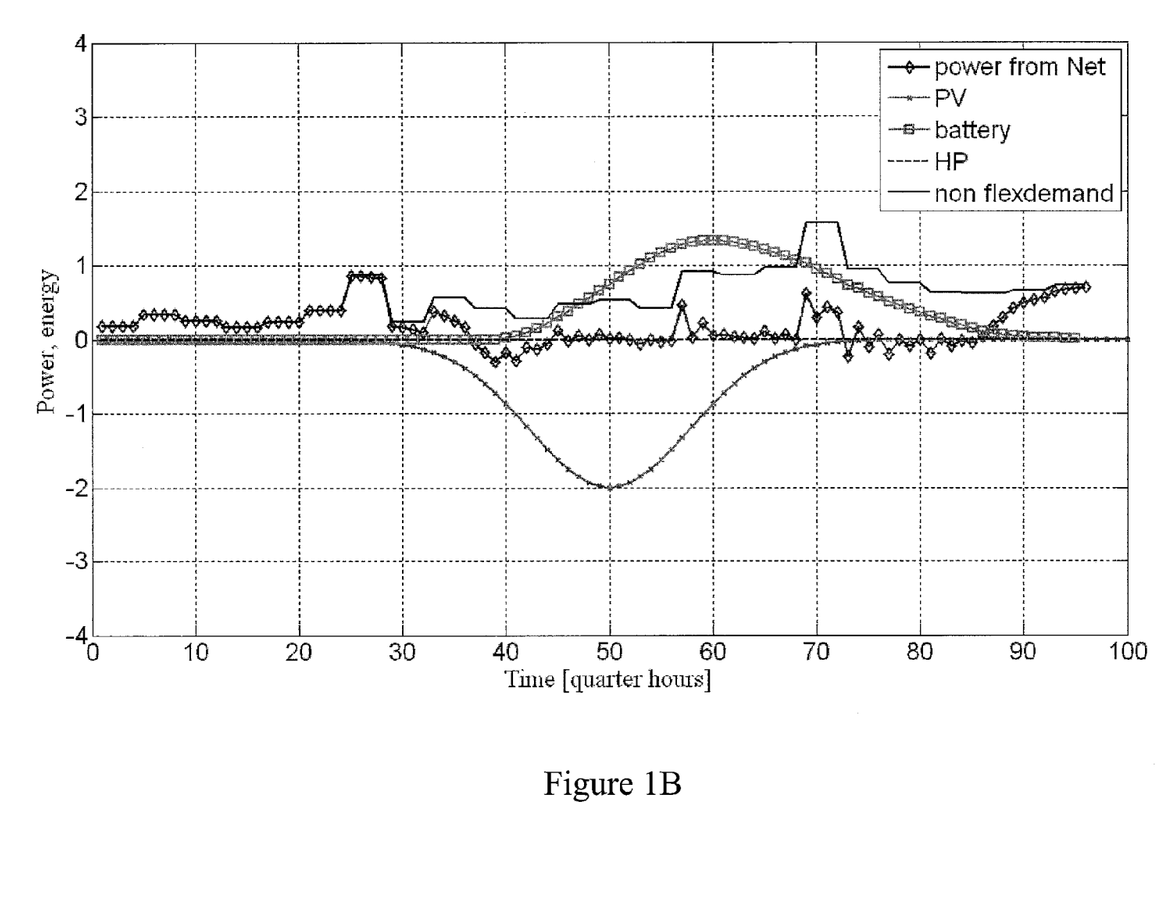
FIG. 1B shows a comparative result of the simulations according to FIG. 1A over a smart grid with the current invention.

The X axis of FIG. 1A and of FIG. 1B indicates time, as quarter hours, while the Y axis of the figure indicates electrical power/energy used or produced by the different devices or drawn from the electrical grid. Positive values indicate electrical energy/power used whereas negative values indicate electrical energy/power produced.

FIG. 1A shows a result of simulations over a smart grid without the current invention.

More specifically, FIG. 1A shows the results of a simulation of electrical devices of a household in which a certain amount of non-participating electrical devices use electrical energy, indicated as "non flexdemand". Moreover, two participating electrical devices are simulated: a photovoltaic ("PV") element producing electrical energy and a battery ("battery") allowing to store electrical energy. The participating electrical devices are connected to an electrical grid through a smart grid by a smart grid agent. The smart grid used for the simulation was INTELLIGATOR®, developed by VITO NV. Although provided, no power from a heat pump ("HP") was introduced in the simulation.

As can be seen, in the simulation, the smart grid agent of the smart grid has determined to store the electrical energy generated by the photovoltaic element in the battery. However, the electrical energy required by the non-participating devices is drawn directly from the electrical grid, as can be seen by the indication "power from Net" and by comparing it to the indicated "non flexdemand".

This is often not desired as it is often desired that the electrical energy produced by the photovoltaic element is used, preferably by the electrical devices of the household themselves, before having to use electrical energy from the electrical grid. In other words, although the battery is charging, the electrical energy preferably was used for the devices of the household, more in particular the non-participating electrical devices.

However, as the non-participating devices are not connected to the smart grid, they can not be taken into account by the smart grid agent.

FIG. 1B shows a comparative result of the simulations according to FIG. 1A over a smart grid with the current invention.

It can now be seen that the electrical energy drawn from the electrical grid is much more reduced. In other words, although the battery is now no longer fully charged by the photovoltaic element, less energy must be drawn from the electrical grid, which is often more desirable as it saves costs, reduces loss of electrical energy during the process of charging the battery, etc.

The invention claimed is:

1. A system for distributing electrical energy over a cluster of electrical devices, the cluster comprising smart grid devices, said smart grid devices comprising at least one smart grid participating electrical device and at least one smart grid non-participating electrical device, the smart grid participating device having flexibility with respect to the execution of a task assigned to it and being connected to an electrical grid through a smart grid by a smart grid agent, and the smart grid non-participating electrical device not being connected to the smart grid by the smart grid agent, the smart grid agent being configured to determine the amount of electrical energy in function of time to be delivered to and from the electrical grid for the electrical devices of the cluster based on information of the electrical devices and the smart grid, the system further comprising a meter for measuring the amount of electrical energy actually delivered to and from the electrical grid for the cluster, the system comprising a controller comprising software components for determining the difference between the amount of energy determined by the smart grid agent for the electrical devices that was or was expected to be delivered to and from the cluster over a predetermined period of time and the amount of energy measured by the meter actually delivered to and from the cluster over the predetermined period of time, the controller comprising software components for simulating a virtual smart grid participating device as the at least one smart grid non-participating electrical device by determining the difference and for providing the smart grid agent with information based on the determined difference such that the smart grid agent is configured to determine the amount of electrical energy in function of time to be delivered to and from the electrical grid for both the smart grid participating device and non-participating device of the cluster based on information of both the smart grid participating and non-participating devices of the cluster and the smart grid for a next period of time, and the system being adapted to control the energy distribution such that the difference between the amount of energy determined by the smart grid agent expected to be delivered to and from the cluster over the next period of time and the amount of energy measured by the meter actually delivered to the cluster over the next period of time is reduced.

2. System according to claim 1, wherein the controller is adapted so that the simulation by the controller of the virtual smart grid participating device is done based on determined differences in the past, for determining an expected amount of energy which will be used by the smart grid non-participating electrical device over the next predetermined period of time.

3. The system according to claim 2, wherein the controller is adapted so that the determination of the expected amount of energy is done periodically, during every predetermined period of time.

4. System according to claim 2, wherein the determined differences in the past used for determining the expected amount of energy which will be used by the smart grid non-participating electrical device over the next period of time comprise the differences determined at a statistically comparable time in the past.

5. System according to claim 4, wherein the determined differences in the past comprise the determined differences from the previous predetermined period of time.

6. System according to claim 1, wherein the controller is adapted to simulate the smart grid agent using a PID controller or a PI controller.

7. System according to claim 6 wherein the PID controller implements a calculation algorithm having three separate parameters: a proportional, an integral and a derivative parameter, denoted P, I, and D, respectively, P depending on a present error, I depending on an accumulation of past errors, and D being a prediction of future errors, based on current rate of change, wherein PID controller calculation algorithm is given by:

$$u(t) = P \cdot e(t) + I \cdot \int_0^t e(\tau)d\tau + D \cdot \frac{d}{dt}e(t)$$

wherein u(t) is the output of the PID controller, the parameters P, I and D represent respectively proportional gain, integral gain and derivative gain, t represents the elapsed time since the beginning represented by 0 and e(t) represents the error being the difference between the amount of energy determined by the smart grid agent to be delivered to and from the cluster over the predetermined period of time and the amount of energy measured by the meter actually delivered to the cluster over the predetermined period of time.

8. System according to claim 7, wherein determining the expected amount of energy which will be used by the smart grid non-participating electrical device over the next period of time, based on determined differences in the past, is done using the PID controller.

9. System according to claim 1, wherein the system comprises a plurality of smart grid participating and smart grid non-participating electrical devices.

10. The system according to claim 1, wherein the system is adapted to control the energy distribution to the smart grid participating devices and/or the smart grid non-participating devices by drawing the electrical energy available on the smart grid before drawing energy from the electrical grid.

11. A method for distributing electrical energy over a cluster of electrical devices of a system, the cluster comprising smart grid devices, said smart grid devices comprising at least one smart grid participating electrical device having flexibility with respect to the execution of a task assigned to it and at least one smart grid non-participating electrical device, the smart grid participating device being connected to an electrical grid through a smart grid by a smart grid agent, and the smart grid non-participating electrical device not being connected to the smart grid by the smart grid agent, the smart grid agent determining the amount of electrical energy in function of time to be delivered to and from the electrical grid for the electrical devices of the cluster based on information of the electrical devices and the smart grid, the system further comprising a meter measuring the amount of electrical energy actually delivered to and from the electrical grid for the cluster, wherein the system comprises a controller determining the difference between the amount of energy determined by the smart grid agent for the electrical devices that was or was expected to be delivered to and from the cluster over a predetermined period of time and the amount of energy measured by the meter actually delivered to and from the cluster over the predetermined period of time, said method comprising the steps of:

simulating a virtual smart grid participating device as the at least one smart grid non-participating electrical device by determining the difference and providing the smart grid agent with information based on the determined difference such that the smart grid agent determines the amount of electrical energy in function of time to be delivered to and from the electrical grid for both the smart grid participating device and the non-participating device of the cluster based on information of both the smart grid participating and non-participating devices of the cluster and the smart grid for a next period of time; and controlling the energy distribution such that the difference between the amount of energy determined by the smart grid agent expected to be delivered to and from the cluster over the next period of time and the amount of energy measured by the meter actually delivered to the cluster over the next period of time is reduced.

12. Method according to claim 11, wherein the simulation by the controller of the virtual smart grid participating device based on the determined difference is done by, based on determined differences in the past, determining an expected amount of energy which will be used by the smart grid non-participating electrical device over the next predetermined period of time.

13. Method according to claim 12, wherein the determined differences in the past used for determining the expected amount of energy which will be used by the smart grid non-participating electrical device over the next period of time comprise the differences determined at a statistically comparable time in the past.

14. Method according to claim 13, wherein the statistical comparable time is any one of the previous day, the previous week, the previous month, the previous year.

15. Method according to claim 12, wherein the determined differences in the past comprise the determined differences from the previous predetermined period of time.

16. Method according to claim 12, wherein the controller simulates the virtual smart grid agent using a PID controller.

17. Method according to claim 16 wherein the PID controller implements a calculation algorithm having three separate parameters: a proportional, an integral and a derivative parameter, denoted P, I, and D, respectively, P depending on a present error, I depending on an accumulation of past errors, and D being a prediction of future errors, based on current rate of change, wherein PID controller calculation algorithm is given by:

$$u(t) = P \cdot e(t) + I \cdot \int_0^t e(\tau)d\tau + D \cdot \frac{d}{dt}e(t)$$

wherein u(t) is the output of the PID controller, the parameters P, I and D represent respectively proportional gain, integral gain and derivative gain, t represents the elapsed time since the beginning represented by 0 and e(t) represents the error being the difference between the amount of energy determined by the smart grid agent to be delivered to and from the cluster over the predetermined period of time and the amount of energy measured by the meter actually delivered to the cluster over the predetermined period of time.

18. Method according to claim 16, wherein determining the expected amount of energy which will be used by the smart grid non-participating electrical device over the next period of time, based on determined differences in the past, is done using the PID controller.

19. Method according to claim 11, wherein the determination of the expected amount of energy is done periodically, during every predetermined period of time.

20. Method according to claim 11, wherein the PID controller is a PI controller.

21. Method according to claim 11, wherein the controller determines the difference between the amount of energy determined by the smart grid agent to be delivered to and from the smart grid participating electrical device over the predetermined period of time and the amount of energy measured by the meter actually delivered to the cluster over the predetermined period of time.

22. A controller for use in a system for distributing electrical energy over a cluster of electrical devices, the cluster comprising smart grid devices, said smart grid devices comprising at least one smart grid participating electrical device and at least one smart grid non-participating electrical device, the smart grid participating device having flexibility with respect to the execution of a task assigned to it and being connected to an electrical grid through a smart grid by a smart grid agent, and the smart grid non-participating electrical device not being connected to the smart grid by the smart grid agent, the controller being adapted for determining a difference between the amount of energy determined by a smart grid agent for the electrical devices that was or was expected to be delivered to and from the cluster over a predetermined period of time and the amount of energy measured by a meter actually delivered to the cluster over the predetermined period of time, the controller being provided to simulate a virtual smart grid participating device as the at least one smart grid non-participating electrical device by determining the difference and to provide the smart grid agent with information based on the determined difference such that the smart grid agent is configured to determine the amount of electrical energy in function of time to be delivered to and from the electrical grid for both the smart grid participating device and the non-participating device of the cluster based on information of both the smart grid participating and non-participating devices of the cluster and the smart grid for a next period of time, and for controlling the energy distribution such that the difference between the amount of energy determined by the smart grid agent expected to be delivered to and from the cluster over the next period of time and the amount of energy measured by the meter actually delivered to the cluster over the next period of time is reduced.

* * * * *